(12) United States Patent
Renz

(10) Patent No.: US 7,175,884 B2
(45) Date of Patent: Feb. 13, 2007

(54) CERAMIC LAYER SYSTEM

(75) Inventor: Hans-Joerg Renz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 528 days.

(21) Appl. No.: 10/645,745

(22) Filed: Aug. 20, 2003

(65) Prior Publication Data

US 2004/0205954 A1 Oct. 21, 2004

(30) Foreign Application Priority Data

Aug. 24, 2002 (DE) ................ 102 38 938

(51) Int. Cl.
  *B05D 1/36* (2006.01)
  *B05D 5/12* (2006.01)
(52) U.S. Cl. .............. 427/402; 427/58; 427/372.2
(58) Field of Classification Search ........... 427/58, 427/402, 372.2; 204/425
  See application file for complete search history.

(56) References Cited

U.S. PATENT DOCUMENTS

| | | | | |
|---|---|---|---|---|
| 4,462,890 A | * | 7/1984 | Touda et al. ............ | 204/425 |
| 5,302,275 A | * | 4/1994 | Dietz et al. ............. | 204/424 |
| 5,310,472 A | * | 5/1994 | Dietz et al. ............. | 204/425 |
| 5,772,863 A | * | 6/1998 | Shoemaker et al. ...... | 204/426 |
| 6,353,381 B1 | * | 3/2002 | Dietmann et al. ........ | 338/25 |

FOREIGN PATENT DOCUMENTS

| | | |
|---|---|---|
| DE | 41 00 108 | 4/1992 |
| DE | 42 28 530 | 6/1993 |
| DE | 42 09 708 | 9/1993 |

* cited by examiner

*Primary Examiner*—Brian K. Talbot
(74) *Attorney, Agent, or Firm*—Kenyon & Kenyon LLP

(57) ABSTRACT

A method for manufacturing a layer system, in particular for a sensor element for determining a physical variable of a gas to be measured, preferably for determining the concentration of a gas component or the temperature in an exhaust gas of an internal combustion engine. The layer system is composed of a ceramic carrier and at least one functional layer to which a solvent is added. A barrier layer is deposited on the ceramic carrier and the functional layer is deposited on the barrier layer. The barrier layer prevents the solvent from penetrating the ceramic carrier from the functional layer.

15 Claims, 1 Drawing Sheet

CERAMIC LAYER SYSTEM

FIELD OF THE INVENTION

The present invention is directed to a method of manufacturing a ceramic layer system.

BACKGROUND INFORMATION

A method is known from German Patent No. 41 00 108, for example. To manufacture a ceramic layer system, electrodes and leads composed of a platinum silk-screen paste or a cermet silk-screen paste having 60 percent platinum by volume and 40 percent zirconium oxide by volume are printed on an unsintered ceramic carrier foil (green foil) composed of zirconium oxide stabilized with yttrium oxide. Subsequently, a cover layer of zirconium oxide may be applied using the screen printing technique. It is furthermore known that the functional layers to be deposited on the ceramic carrier foil may be treated with an organic solvent, e.g., butylcarbitol or 2-ethyl-1-hexanol, in order to enhance the workability of the functional layers.

A disadvantage thereof is the fact that solvent from the printed functional layers penetrates the ceramic carrier. The solvent reacts with organic compounds contained in the ceramic carrier, for example, which causes the ceramic carrier to shrink or even disintegrate while the printed functional layers dry. If shrinkage occurs, the ceramic carrier may become warped. If the ceramic carrier is laminated together with further ceramic carriers on which functional layers may also be printed, the ceramic carriers become positioned incorrectly in relation to each other if the ceramic carriers have shrunken by different amounts.

SUMMARY OF THE INVENTION

The method according to the present invention has the advantage that the barrier layer prevents the solvent from penetrating the ceramic carrier, at least to a large extent. Shrinkage of the ceramic carrier is reduced markedly as a result, preventing the disadvantages of the related art.

Advantageously, the barrier layer contains polyvinyl alcohol and water. A defoaming agent may be added to the barrier layer if necessary for application of the barrier layer. After the barrier layer is deposited on the ceramic carrier, it is subjected to a drying process, in which the water contained in the barrier layer volatilizes. The functional layer is then deposited on the barrier layer. Instead of polyvinyl alcohol, a two-component lacquer has also proven suitable.

The ceramic layer system is subjected to a heat treatment, during which, in a first phase, the ceramic layer system is heated first of all to a temperature below the sintering temperature of the ceramic carrier. The barrier layer vaporizes during the first phase. The solvent contained in the functional layer volatilizes at the latest during the first phase of the heat treatment and, in fact, before the barrier layer is vaporized completely.

In a second phase of the heat treatment, the ceramic layer system is then heated to a higher temperature, at which the ceramic carrier and the functional layer fuse. This ensures that the solvent is prevented from penetrating the ceramic carrier before sintering takes place, although the functional layer may fuse with the ceramic layer during sintering, however, so that the functional layer bonds with the ceramic carrier in a reliable manner. A thickness of the dried barrier layer of 10 to 20 mm has proven particularly suitable.

The functional layer is, for example, an electrode or its lead, a heating element, an insulating layer, a layer that contains a pore-forming material and leaves a cavity or a porous material after sintering, or a protective layer. Advantageously, the functional layer and the barrier layer are deposited using the screen printing technique.

DETAILED DESCRIPTION

Figure 1:
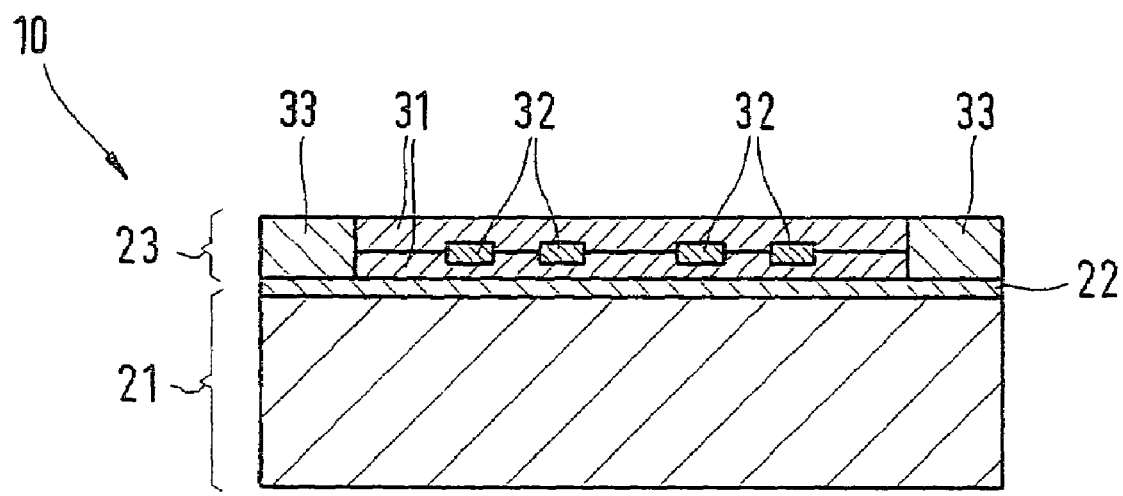
FIGS. 1 and 2 show a first and second layer system—before the sintering process—that is manufactured using the method according to the present invention.

FIG. 1 shows a ceramic layer system 10 prior to a sintering process, the layer system including a ceramic carrier 21 and a functional layer 23, between which a barrier layer 22 is located. Functional layer 23 contains a meander-like heating element 32 embedded in a porous heating element insulation 31, and a sealing frame 33 that seals the heating element insulation 31 on the sides.

Figure 2:
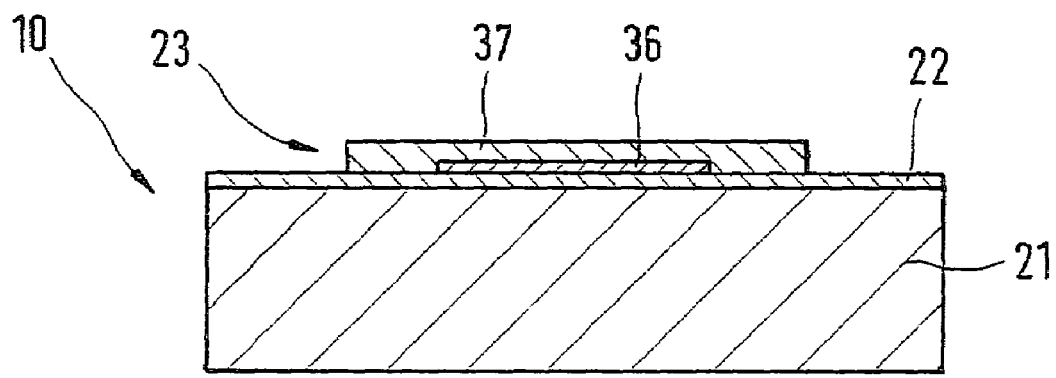

FIG. 2 shows a layer system having a similar construction. Elements that are the same as in FIG. 1 were labeled with the same reference numerals as in FIG. 1. Ceramic layer system 10 differs from the layer system shown in FIG. 1 in terms of the design of functional layer 23. Functional layer 23 in FIG. 2 includes an electrode 36 deposited on barrier layer 22, the electrode being covered by a porous protective layer 37.

Ceramic layer system 10 according to FIG. 1 or FIG. 2 is manufactured by depositing barrier layer 22 on ceramic carrier 21 in a first step. When deposited on ceramic carrier 21, barrier layer 22 contains polyvinyl alcohol in a portion of 50 percent by volume, and water in a portion of 50 to 60 percent by volume (Mowiol from Clariant, for example). In an alternative exemplary embodiment of the invention, a defoaming agent is also added to barrier layer 22.

The barrier layer can contain a two-component lacquer as an alternative to polyvinyl alcohol.

In a second step, barrier layer 22 is subjected to a drying process in which the water contained in barrier layer 22 volatilizes. Dried barrier layer 22 has a thickness of 15 mm. After the drying process, the barrier layer is unpenetrable by solvent.

In a third step, functional layer 23 (or a plurality of functional layers) is deposited on ceramic carrier 21—which is covered by dried barrier layer 22—using the screen printing technique. The various elements 31, 32, 33, 37 of functional layer 23 are deposited in paste-like form in one or more screen printing steps. The paste for porous heating element insulation 31 contains aluminum oxide, the paste for sealing frame 33 contains zirconium oxide stabilized with yttrium oxide, the paste for heating element 32 and electrode 36 contains a cermet having platinum and zirconium oxide, and the paste for porous protective layer 27 contains a ceramic. In order to provide the pastes in the consistency required for screen printing, the pastes that form elements 31, 32, 33, 36, 37 of functional layer 23 contain various additives, such as binding agents, softening agents, pore forming materials, if necessary, and butyl carbitol or 2-ethyl-1-hexanol as solvents. These additives volatilize partially at room temperature. At the latest, however, these additives volatilize during the subsequent heat treatment.

In an exemplary embodiment of the present invention that is not shown in greater detail, the compound composed of the ceramic carrier, barrier layer, and functional layer is laminated together with a further ceramic carrier (or a plurality of further ceramic carriers) having a similar construction. For example, ceramic layer system 10 of the first exemplary embodiment shown in FIG. 1 is laminated together with a further ceramic carrier, so that functional layer 23 is located between two ceramic carriers after sintering. A further barrier layer is provided between the further ceramic layer and functional layer 23.

In a fourth step, ceramic layer system 10 manufactured in this manner is subjected to a heat treatment. To accomplish this, the layer system is heated continually, first of all, from room temperature to a temperature of 200 degrees Celsius over a period of 2 hours, which causes barrier layer 22 to vaporize. Heating the barrier system slowly ensures that the solvent has volatilized at least to a large extent before the barrier layer has vaporized completely. Ceramic layer system 10 is then heated to a temperature of 1250 degrees Celsius, so that functional layer 23 fuses with ceramic carrier 21.

The present invention may be applied to all functional layers that contain an element treated with a solvent. In general, "solvent" in this context is understood to mean a substance that is able to react with components of the ceramic carrier at temperatures markedly below the sintering temperature.

What is claimed is:

1. A method for manufacturing a layer system, the layer system including a ceramic carrier and at least one functional layer, the functional layer containing a solvent, the method comprising:

depositing a barrier layer on the ceramic carrier;

depositing the functional layer on the barrier layer, wherein the barrier layer prevents the solvent from penetrating the ceramic carrier from the functional layer, and wherein, after the functional layer is deposited, the barrier layer is vaporized by heating.

2. The method according to claim 1, wherein the layer system is for a sensor element for determining a physical variable of a gas to be measured.

3. The method according to claim 2, wherein the sensor element is for determining at least one of a concentration of a gas component and a temperature in an exhaust gas of an internal combustion engine.

4. The method according to claim 1, further comprising, after the barrier layer is deposited and before the functional layer is deposited, subjecting the barrier layer to a drying process.

5. A method for manufacturing a layer system, the layer system including a ceramic carrier and at least one functional layer, the functional layer containing a solvent, the method comprising:

depositing a barrier layer on the ceramic carrier;

depositing the functional layer on the barrier layer, wherein the barrier layer prevents the solvent from penetrating the ceramic carrier from the functional layer, and wherein the barrier layer is selected from a group containing at least one of polyvinyl alcohol and a two-component lacquer and wherein, after the functional layer is deposited, the barrier layer is vaporized by heating.

6. A method for manufacturing a layer system, the layer system including a ceramic carrier and at least one functional layer, the functional layer containing a solvent, the method comprising:

depositing a barrier layer on the ceramic carrier;

depositing the functional layer on the barrier layer, wherein the barrier layer prevents the solvent from penetrating the ceramic carrier from the functional layer, wherein the barrier layer, when deposited on the ceramic carrier, substantially contains polyvinyl alcohol in a proportion of 30 to 50 percent by weight, and water in a proportion of 50 to 70 percent by weight, and the water vaporizes during a drying process that follows an application and wherein, after the functional layer is deposited, the barrier layer is vaporized by heating.

7. The method according to claim 6, wherein the proportion of polyvinyl alcohol is 40 percent and the proportion of water is 60 percent.

8. A method for manufacturing a layer system, the layer system including a ceramic carrier and at least one functional layer, the functional layer containing a solvent, the method comprising:

depositing a barrier layer on the ceramic carrier;

depositing the functional layer on the barrier layer, wherein the barrier layer prevents the solvent from penetrating the ceramic carrier from the functional layer, and the method further comprising adding a defoaming agent to the barrier layer and wherein, after the functional layer is deposited, the barrier is vaporized by heating.

9. The method according to claim 1, wherein the barrier layer has a thickness of 10 to 20 μm after a drying process.

10. A method for manufacturing a layer system, the layer system including a ceramic carrier and at least one functional layer, the functional layer containing a solvent, the method comprising:

depositing a barrier layer on the ceramic carrier;

depositing the functional layer on the barrier layer, wherein the barrier layer prevents the solvent from penetrating the ceramic carrier from the functional layer, and wherein, after the functional layer is deposited, the barrier layer disintegrates.

11. A method for manufacturing a layer system, the layer system including a ceramic carrier and at least one functional layer, the functional layer containing a solvent, the method comprising:

depositing a barrier layer on the ceramic carrier;

depositing the functional layer on the barrier layer, wherein the barrier layer prevents the solvent from penetrating the ceramic carrier from the functional layer, and the method further comprising subjecting the layer system to a heat treatment in which, in a first phase, the layer system is heated to a temperature below a sintering temperature of the ceramic carrier, the barrier layer disintegrating, and in which, in a second phase, the layer system is heated to a temperature at which the ceramic carrier and the functional layer fuse.

12. The method according to claim 11, wherein the layer system, in the first phase, is heated from 20 degrees Celsius to 200 degrees Celsius over a period of 2 hours and, in a second phase, is heated from 200 degrees Celsius to over 1200 degrees Celsius and is held at a temperature over 1200 degrees Celsius for 3 to 8 hours.

13. The method according to claim 1, wherein the barrier layer and the functional layer are applied to the ceramic carrier through an operation selected from one of using a screen printing method, by spraying, and using a coating unit with pressure rollers.

14. The method according to claim 1, wherein the at least one functional layer includes an electron-conducting layer including at least one of an electrode, a heating element, a printed resistor, a lead, an insulating layer, an oxygen ion-conducting layer, a porous protective layer, and a layer that leaves behind one of a cavity and a porous material after sintering.

15. The method according to claim 1, wherein the functional layer contains at least one of butylcarbitol and 2-ethyl-1-hexanol as the solvent.

* * * * *